United States Patent [19]
Prohofsky

[11] 3,766,818
[45] Oct. 23, 1973

[54] ELECTRONIC FREQUENCY MEASURING APPARATUS

[76] Inventor: Leroy A. Prohofsky, 6841 Knox Ave., South, Minneapolis, Minn. 55423

[22] Filed: May 1, 1972

[21] Appl. No.: 249,310

[52] U.S. Cl. .............................. 84/454, 324/79 R
[51] Int. Cl. ............................................. G10g 7/02
[58] Field of Search ............. 324/79 R, 79 D, 83 R, 324/83 A, 83 D, 78 Z; 84/1.01, 454

[56] References Cited
UNITED STATES PATENTS

| | | | |
|---|---|---|---|
| 3,518,540 | 6/1970 | Roberts | 324/79 D |
| 3,539,920 | 11/1970 | Boltz | 324/79 D |
| 3,576,532 | 4/1971 | Kaps | 324/79 D |
| 3,696,293 | 10/1972 | Hoffmann et al. | 324/79 D |
| 3,722,353 | 3/1973 | Westhaver | 84/454 |
| 2,878,448 | 3/1959 | Maxey | 324/78 Z |
| 3,144,802 | 8/1964 | Faber, Jr. et al. | 84/454 |
| 3,280,937 | 10/1966 | Faber, Jr. et al. | 324/79 D X |
| 3,472,116 | 10/1969 | Schott | 84/454 |
| 3,509,454 | 4/1970 | Gossel | 324/79 R |

Primary Examiner—Richard B. Wilkinson
Assistant Examiner—U. Weldon
Attorney—Thomas J. Nikolai

[57] ABSTRACT

An electronic device to facilitate the comparison of a signal of an unknown frequency with a reference frequency for producing an indication as to whether the unknown frequency is greater than, equal to, or less than the reference frequency is described.

9 Claims, 7 Drawing Figures

3,766,818

ELECTRONIC FREQUENCY MEASURING APPARATUS

BACKGROUND OF THE INVENTION

This invention relates to frequency measuring apparatus and more specifically to an electronic digital device for comparing the frequency of a musical tone with a reference signal and for producing an indication as to whether the tone is in tune with the reference signal or is sharp or flat with respect thereto. As such, the device of this invention finds specific application in the tuning of muscial instruments. However, the invention is also suitable as a scientific instrument for measuring and testing purposes.

There is described in the prior art various electronic and electromechanical devices for facilitating the tuning of muscial instruments. Generally speaking, however, these prior art devices may be classified either as analog approaches or electromechanical approaches.

In the analog approach, the instrument under test is made to produce a tone and this tone is converted to an electrical signal whose frequency is the same as or directly proportional to the frequency of the tone in question. This electrical signal is then compared with a reference frequency, usually by beating the two signals together and observing the frequency differences between the unknown and the reference. In the analog approach the wave forms operated upon are generally sinusoidal in nature. A typical example of the analog prior art arrangement is set forth in the Bergan et al. U.S. Pat. No. 2,207,450. In this arrangement a variable frequency oscillator produces an alternating current wave form which is amplified and applied to the primary winding of a transformer. At the same time, the acoustic energy representing the tone under test is converted to an electrical signal by the microphone 57 and the resulting alternating signal is also applied by way of an amplifier to the primary winding of the same transformer. This transformer serves to beat these two alternating current signals and the resulting secondary winding output signal is used to drive a cathode-ray tube indicator.

The aforementioned electromechanical prior art arrangement of a muscial instrument tuner is represented by the Krauss U.S. Pat. No. 2,806,953 in which a stroboscopic wheel is illuminated by a neon lamp which is caused to flash at the frequency of the unknown musical tone. When the instrument is in tune, i.e., the frequency of the flashing light equals the frequency of transistions from light to dark bands on the stroboscopic wheel, a stationery pattern will be observed. If the instrument is flat, the pattern will appear to rotate in a first direction. If the instrument is sharp, the pattern appears to rotate in the opposite direction. It is therefore necessary for the observer to perceive both the direction of rotation of the pattern and the rate of rotation thereof to distinguish sharp from flat and the degree of frequency difference.

It has been found that analog frequency comparator circuits are not totally satisfactory because of their inherent susceptibility to inaccuracies in establishing the frequency differences due to variations in both power supply voltages and component values. Further, the analog arrangements generally involve components which require relatively high power consumption and are rather large in size. Furthermore, the prior art analog frequency comparator circuits often suffer from the disadvantage that they do not distinguish the sign of the frequency difference to establish whether the reference frequency is greater than, or less than the frequency of the signal under test.

While the stroboscopic electromechanical arrangement does indicate the sign of the frequency difference, by the apparent direction of rotation of the wheel, such arrangements tend to be expensive, bulky and subject to damage due to shock and vibration.

In accordance with the teachings of the present invention, there is provided a completely electronic digital apparatus capable of comparing a tone of an unknown frequency to a reference frequency and providing an indication that the unknown frequency is higher than, equal to or lower than the reference frequency. Furthermore, the digital logic employed facilitates the use of integrated circuit technology such that the instrument tuning apparatus is compact, inexpensive, and extremely rugged.

While the present invention is suitable for use as a scientific laboratory instrument for measuring frequency differences, the preferred embodiment as described herein relates to its use as a device for facilitating the tuning of musical instruments.

Normally a musical instrument, such as a stringed or certain wind instruments, is tuned by listening to the beat tone generated when the instrument and a reference tone are played simultaneously. An individual beat or beat cycle, results when the phase angle between the two tones changes by 360°. The beat frequency is thus the frequency difference between the two tones. The device of the present invention displays the sign as well as the beat frequency between the tone produced by the instrument being tuned and the output from an internal reference oscillator. The reference oscillator is designed so that it can be set to any one of the twelve tones which comprise the tempered chromatic scale. If the tone produced by the instrument under test is of a slightly higher frequency than that of the reference, a first lamp will be flashed on and off to indicate a sharp condition with the rate of pulsation indicating the beat frequency. In a similar fashion, if the frequency of the tone produced by the instrument under test is below that of the reference a second indicator lamp will be flahsed on and off to indicate the flat condition. Again, the rate of flashing indicates the beat frequency. With this information, the characteristics of the instrument being tuned may be varied to bring it to the desired tone.

Accordingly, it is the principal object of this invention to provide an electronic digital apparatus for comparing a signal of a reference frequency to that of an unknown frequency for indicating whether the unknown signal has a frequency greater than, equal to or less than the reference signal.

It is another object of this invention to provide a digital musical instrument tuner capable of displaying both the sign and the magnitude of the frequency difference between a reference signal and a tone produced by an instrument being tuned.

Another object of the invention is to provide a musical instrument tuner which gives a positive indication of a sharp or flat condition as well as the beat frequency between the two signals so that the output therefrom can be readily interpreted by an untrained user.

Still another object of the invention is to provide an electronic digital instrument which utilizes solid state components throughout and which may conveniently be implemented with integrated circuits so as to be simple, compact and reliable.

A further object of the invention is to provide an electronic device which will display the average beat frequency between the reference signal and the tone produced by a musical instrument under test when the instantaneous beat frequency may by varying due to vibrato or any other similar fluctuation.

Yet still another object of the invention is to provide a musical instrument tuner which is capable of tuning any tone which is a harmonic or sub-harmonic of the reference frequency employed.

DESCRIPTION OF THE DRAWINGS

The novel features which are believed to be characteristic of the invention, both as to organization and method of operation, together with further objects and advantages thereof, will be better understood from the following description considered in connection with the accompanying drawings in which the preferred embodiment of the invention is illustrated by way of example. It is expressly understood, however, that the drawings are for the purpose of illustration and description only, and are not intended as a definition of the limits of the invention.

DESCRIPTION OF THE PREFERRED EMBODIMENT

Figure 1:
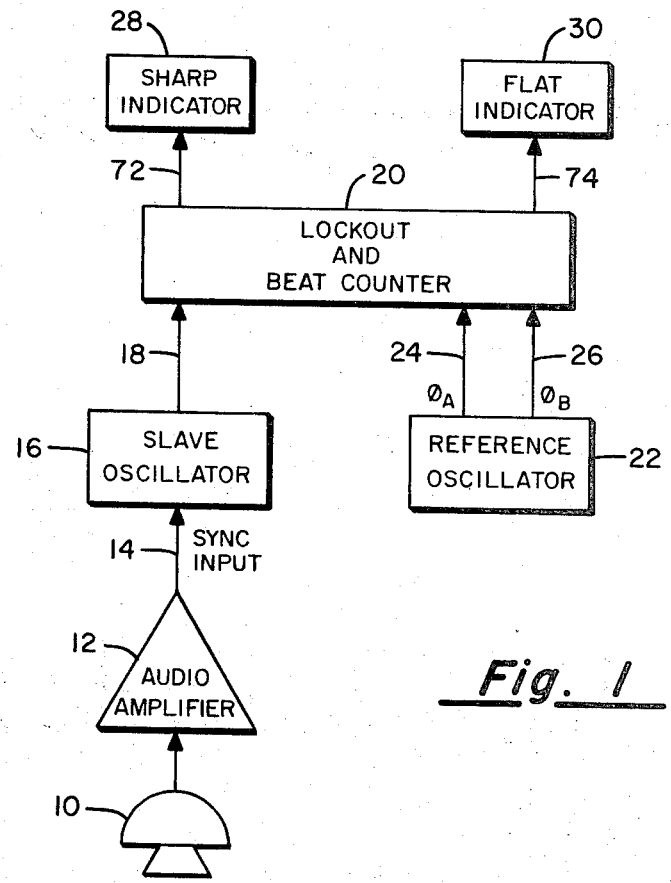
FIG. 1 is a block diagram of the preferred embodiment.

Referring now to FIG. 1, there is shown a microphone 10 which is adapted to receive acoustic energy from a muscial instrument under test and to convert this energy to an electrical signal in a conventional fashion. The resulting signal is applied to an audio amplifier 12 so as to produce an output on line 14 of a sufficiently high amplitude so as to be usable.

The output on line 14 is applied to the "sync" input of a "Slave" oscillator 16. Oscillator 16 is designed so that when its nominal frequency of oscillation to which it is set is sufficiently close to the frequency of the signal applied to its "sync" input, it will lock into step with the "sync" input signal and will oscillate at the frequency of that signal. The Slave oscillator 16 produces pulse type signals on its output line 18 and the repetition rate of the pulses from the Slave oscillator is directly proportional to the frequency of the "sync" input signal on line 14.

As is illustrated in FIG. 1, the output from the Slave oscillator on line 18 is applied to a first input of a "Lock-out and Beat Counter" circuit 20. Also connected to the circuit 20 is a Reference oscillator 22. The Reference oscillator is designed to produce two-phase underlapped pulses (termed $\phi A$ and $\phi B$ pulses) of selectively variable repetition rates on the output lines 24 and 26. The Reference oscillator may be of the so-called relaxation type, capable of producing pulses having frequencies or repetition rates corresponding to any one of the 12 tones which comprise the tempered chromatic scale. Furthermore, in the preferred embodiment of the invention this Reference oscillator 22 is set to run at precisely twice the frequency of the desired pitch. On the other hand, the Slave oscillator 16 has a nominal frequency equal, within predetermined tolerances, to the desired pitch. Therefore, the output from the Reference oscillator 22 has a nominal frequency twice that of the output from the Slave oscillator 16.

The $\phi A$ and $\phi B$ outputs from the Reference oscillator 22 and the single phase output from the Slave oscillator 16 are interpreted by the digital logic circuits comprising the Lock-out and Beat Counter 20. Depending upon the frequency difference between the output from the Slave oscillator and the output from the Reference oscillator, one or the other of the indicator devices 28 or 30 will be operated. However, when the musical instrument under test is in tune and therefore producing a signal which is exactly one-half the frequency of he output from the Reference oscillator, one or the other of the indicator devices 28 or 30 will be operated. However, when the musical instrument under test is in tune and therefore producing a signal which is exactly one-half the frequency of the output from the Reference oscillator, neither indicator 28 nor indicator 30 will be operative.

Now that the general organization of the digital instrument tuner of this invention has been described, consideration will be given to the construction of the Lock-out and Beat Counter circuit 20 which is the heart of the invention.

Figure 2:
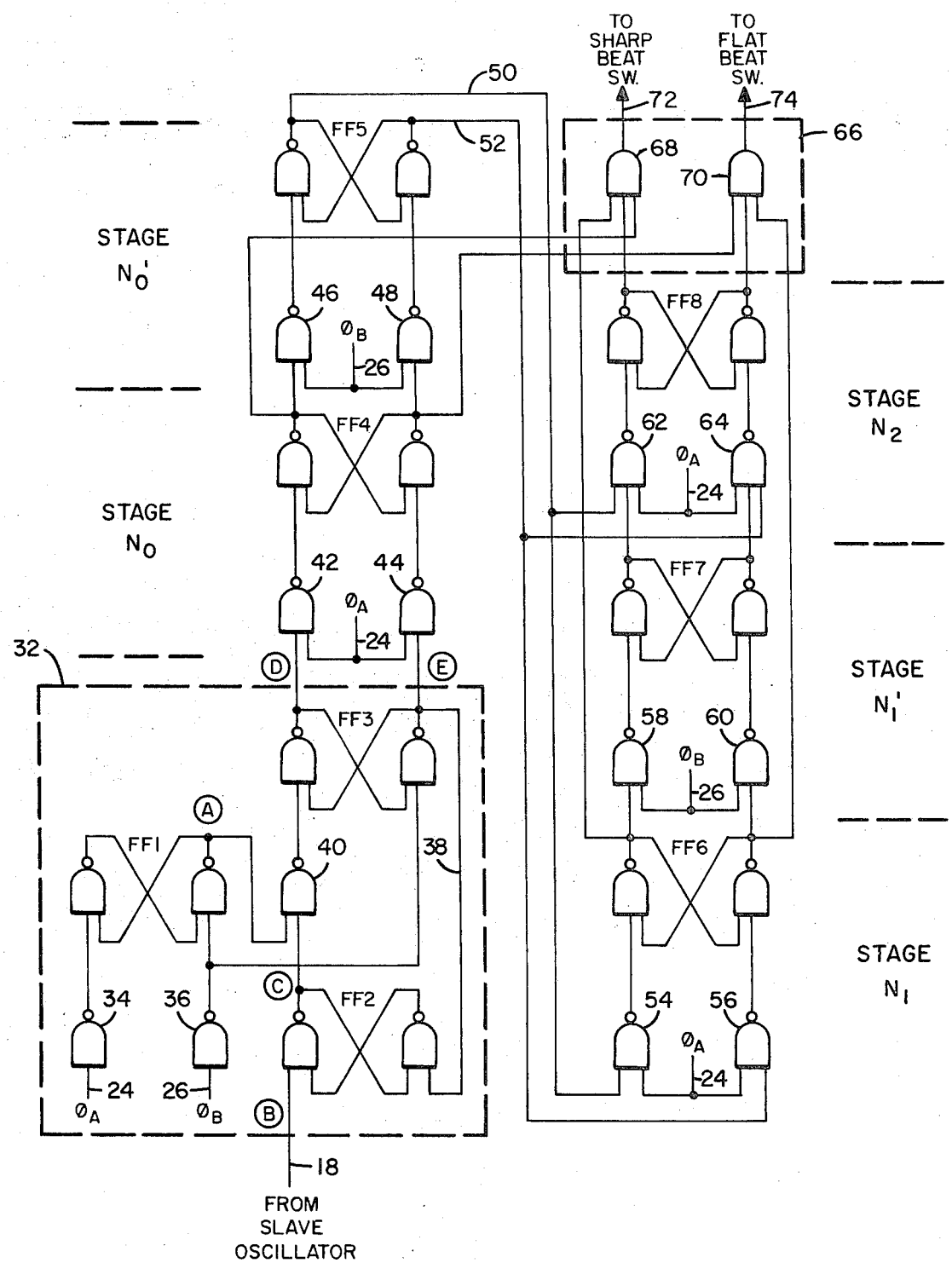
FIG. 2 is a logic diagram of the Lock-out and Beat Counter of FIG. 1.

Referring to FIG. 2, the lock-out portion of the Lock-out and Beat Counter circuit 20 is shown enclosed by dashed lines 32. It includes a plurality of bistable circuits or flip-flops FF1, FF2 and FF3. These flip-flops are shown as being formed from standard NAND type logic circuits in which the zero state is represented by a voltage which is approximately zero and a one state is represented by a positive voltage. When a signal applied to the left hand side of the flip-flop will be effective to place it in the "Set" condition, it may then be subsequently reset or cleared by the application of a similar pulse to the right hand side or "Reset" terminal.

The two-phase output pulse trains from the Reference oscillator 22 (FIG. 1) are applied to the $\phi A$ and $\phi B$ lines 24 and 26 which connect to the input of a pair of inverters 34 and 36, respectively. Inverter 34 has its output connected to the Set terminal of FF1 and inverter 36 has its output terminal connected to the Reset terminals of flip-flops FF1 and FF3. The output from the Slave oscillator appearing on line 18 connects to the Set terminal of FF2 and the Reset input for FF2 is applied by way of conductor 38 from the Reset output terminal of FF3.

The Reset output from FF1 and the Set output from FF2 are ANDed together in coincidence gate 40 whose output is connected to the Set input of FF3. The beat counter portion of FIG. 2 is comprised of five concatenated stages identified as stages $N_0$, $N'_0$, $N_1$, $N'_1$, and $N_2$. Each of these stages includes a Set-Reset type flip-flop and a pair of coincidence circuits (NAND gates) with one such gate being associated with the Set input terminal of the flip-flop and the remaining gate associated with the Reset input terminal.

More specifically, stage $N_0$ includes a Set-Reset flip-flop FF4 and a pair of gates 42 and 44. Gate 42 has its first input terminal connected to the Set output of FF3 in the Lock-out Circuit and gate 44 has its input terminal connected to the Reset output of the flip-flop FF3. The second input terminals of both gates 42 and 44 are connected to the $\phi A$ terminal 24 of the Reference oscillator 22 in FIG. 1. Thus, when the Lock-out flip-flop FF3 is set, when the $\phi A$ clock pulse occurs, gate 42 will be enabled and will pass an output signal to the Set input terminal of flip-flop FF4. In a similar fashion, when FF3 is Reset or cleared, gate 44 will produce an output when a $\phi A$ clock pulse appears to thereby apply a Reset signal to flip-flop FF4. The signal appearing at the output terminals of FF4 are applied through gates 46 and 48 to the Set and Reset input terminals of flip-flop FF5 when a $\phi B$ signal is generated by the Reference oscillator 22. This $\phi B$ signal is applied to gates 46 and 48 via line 26. The Set and Reset output terminals of flip-flop FF5 are connected by conductors 50 and 52 respectively to a first input terminal of a pair of gates 54 and 56 in stage $N_1$ and, accordingly, the information stored in flip-flop FF5 will be transferred to flip-flop FF6 upon the occurrence of a $\phi A$ clock pulse from the Reference oscillator 22.

In a similar fashion the gates 58 and 60 in stage $N'_1$ will permit the transfer of the data stored in FF6 and FF7 upon the occurrence of a $\phi B$ clock pulse.

The gates 62 and 64 associated with stage $N_2$ have three inputs rather than two as in each of the previous stages described. More specifically, the gate 62 receives a first input from the Set output terminal of FF5, the Set output terminal of FF7 and a $\phi A$ clock pulse from the Reference oscillator. Similarly, the gate 64 associated with the Reset terminal of FF8 receives as its inputs the signals appearing at the Reset output of flip-flops FF5 and FF7 as well as a $\phi A$ clock pulse. Thus, if FF5 and FF7 are each set at the time that a $\phi A$ clock pulse occurs, gate 62 will be enabled to produce an output signal for setting flip-flop FF8. On the other hand, if FF5 and FF7 ar each reset at the time that the $\phi A$ pulse occurs, the flip-flop FF8 will be reset or cleared if it is not already in that condition. If the states of FF5 and FF7 are not identical neither gate 62 nor gate 64 will be enabled, thus, FF8 is unchanged.

The logic for controlling the Sharp Beat Indicator 28 and the Flat Beat indicator 30 is shown enclosed by dashed lined box 66. This logic takes the form of a pair of gates 68 and 70. Gate 68 is connected to the Set output terminals of flip-flops FF4, FF6, and FF8. The gate 70 receives its input signals from the Reset output terminals of these same flip-flops. When each of them is simultaneously set, the gate 68 will produce an output signal on conductor 72 which is used to control the Sharp Beat Indicator switch to be described. Similarly, when the flip-flops FF4, FF6 and FF8 are simultaneously cleared, gate 70 will be enabled to apply a control signal to the line 74 connected to the Flat Beat Indicator switch.

It is to be understood that the Lock-out and Beat Counter could be implemented with any alternate logic circuits which accomplish the equivalent logical function. Specifically the so-called JK type of flip-flops could be used in conjunction with a single phase clock, to thereby obviate the need for a two-phase source.

Figure 3:
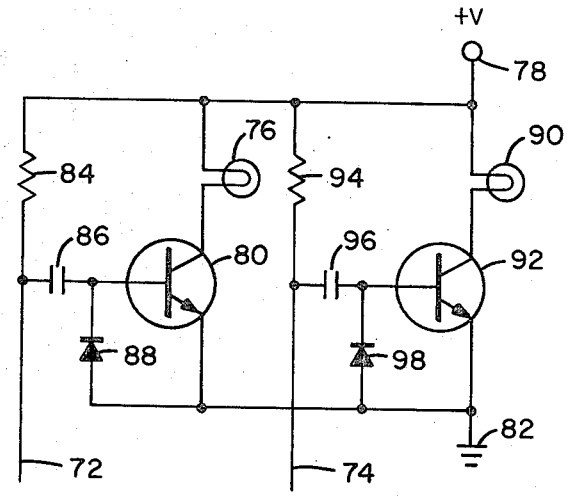
FIG. 3 is a schematic diagram of the circuits used to implement the sharp and flat beat indicators.

The details of the sharp and flat beat indicator circuits are shown in FIG. 3. The sharp indicator network includes an indicator lamp 76 connected in series between a source of positive voltage 78, the collector to emitter path of an NPN transistor 80 and ground 82. While a lamp is illustrated, other suitable devices for producing an observable manifestation may be employed. Connected between the source 78 and the base or control electrode of the transistor 80 is a time delay circuit including a resistor 84 and a capacitor 86. A diode 88, poled as shown, is connected between ground 82 and the base electrode of the transistor 80.

An identical control circuit is provided to control the illumination of the flat beat indicator lamp 90. More specifically, the lamp 90 is connected in series with the emitter to collector path of a semiconductor switching device 92 between ground 82 and the positive voltage source 78. Again, the base electrode of the NPN transistor 92 is coupled to the source 78 through an RC time delay circuit, including resistor 94 and capacitor 96. A diode 98 is connected between the ground terminal 82 and the base electrode of the transistor 92.

The transistors 80 and 92 are normally held in a non-conducting state with the voltage on line 72 equal to +V and the current through resistor 84 and capacitor 86 equal to zero. With the transistors 80 and 92 non-conducting, a relatively high impedance is in series with the indicator lamps 76 and 90 such that insufficient current flows through them to cause them to be illuminated. When the sharp beat indicator control gate 68 (FIG. 2) is fully enabled, the line 72 is effectively connected to ground such that the capacitor 86 will discharge through the diode 88. The enabled condition persists for only one period of the reference oscillator. After this period the output control gate 68 again becomes a high impedance. Current flows through resistor 84 and capacitor 86 into the base of transistor 80 until the capacitor is again charged to a voltage equal to +V minus the base to emitter drop of transistor 80. With transistor 80 conducting, a substantial current will flow through the indicator lamp 76 and the collector to emitter path of the transistor 80 such that the lamp will glow. It will remain illuminated until the transistor 80 is again switched off. The time delay circuit comprised of resistor 84 and capacitor 86 insures that the lamp will have sufficient persistence to make it readily visible.

In a similar fashion if a flat beat control signal is produced at the output of gate 70, the line 74 will in effect be grounded and the capacitor 96 will therefore discharge through the diode 98. Once capacitor 96 is discharged, transistor 92 will be turned on and will remain on until such time that the charge again builds up on capacitor 96 by way of resistor 94. So long as the transistor 92 is in its low impedance state, the flat beat indicator lamp 90 will glow.

Although it is possible for either of gates 68 or 70 to be spuriously enabled during the transition of counter states, these spurious pulses are typically too short (approximately 100 nsec) to significantly alter the charge on capacitors 86 and 96 so that the transistors continue to be non-conducting.

Now that the details of the construction of the preferred embodiment have been described in detail, consideration will next be given to its mode of operation.

OPERATION

Referring again to the block diagram of FIG. 1, the instrument being tuned produces acoustical energy of a given frequency which is received by the microphone 10 and converted into a low amplitude electrical oscillation. This signal is amplified to a desired level by audio amplifier 12 and applied to the "sync" input of the Slave oscillator 16. As was mentioned previously, the Slave oscillator has a nominal frequency close to the desired pitch such that when the "sync" input signal is applied thereto, the oscillator will lock into synchronism with this "sync" signal and will produce rectangular pulses having a repetition rate proportional to the frequency of the "sync" signal.

While generally the Slave oscillator 16 is made to lock in on the fundamental frequency of the input signal, in operation it is also possible to synchronize the slave oscillator with a harmonic or sub-harmonic tone. When the unknown frequency is a sub-harmonic of the Slave oscillator frequency a synchronizing event will not occur during each period but rather during each $n^{th}$ period where n is the ratio of the Slave oscillator frequency and the unknown frequency. When the oscillator is of the so-called relaxation type each period will be a nominal period unless lengthened or shortened by synchronization. Thus, when the nominal frequency of the Slave oscillator is slightly different than the nearest harmonic of the unknown frequency the resulting oscillator frequency will be nominal for $n-1$ cycles and will instantaneously change on the $n^{th}$ cycle. This instantaneous fluctuation in frequency can give rise to successive alternate sharp and flat beats even though the average frequency may be exactly in tune. These successive alternate sharp and flat beats must be suppressed for the display to be meaningful since any near simultaneous display of both sharp and flat beats would confuse the interpretation of the frequency sign.

Figure 4:
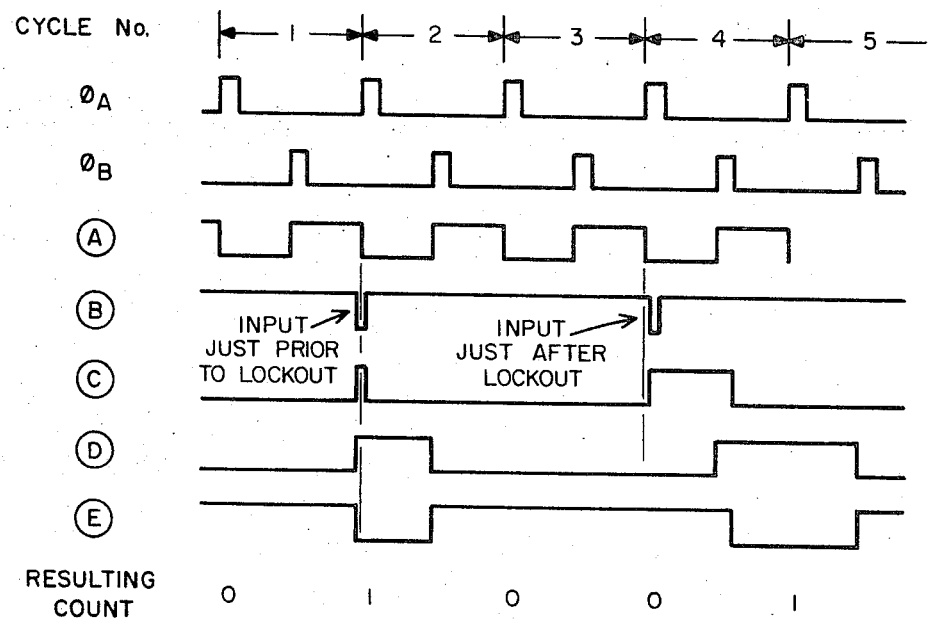
FIG. 4 illustrates the waveform of the output from various identified points in the Lock-out circuit and is used in the following description to facilitate an understanding of the operation thereof.

The Reference oscillator 22 is a variable frequency device which can be set to produce output pulses of desired repetition rates within a range of values. This Reference oscillator is set to run at precisely the frequency of the desired pitch. The two phase output pulses produced by the Reference oscillator 22 are illustrated in FIG. 4 as $\phi A$ and $\phi B$ signals. As can be seen from FIG. 4, these pulses are underlapped and are of sufficient width to be able to set the flip-flops in the Lock-out and Beat Counter circuit 20.

The output pulse trains from the Reference oscillator 22 and the Slave oscillator 16 are interpreted by the digital logic circuits which comprise the Lock-out and Beat Counter 20. The beat conditions are interpreted by testing the output condition of the Slave oscillator over the time period defined by two cycles of the Reference oscillator. When the instrument is in tune, there will be one output pulse from the Slave oscillator in each time period since the Slave oscillator frequency is exactly one-half that of the Reference oscillator. The Beat Counter network interprets this as the "zero beat cycle" condition. When a time period comprised of two cycles of the reference waveform occurs in which there is no output pulse from the Slave oscillator 16, this indicates that the Slave oscillator is running slow and that a "negative beat cycle" condition has occurred. Finally, when the condition arises that there are two output pulses from the Slave oscillator during a time period defined by two cycles of the reference waveform, it indicates that the Slave oscillator 16 is running fast and that a "positive beat cycle" condition has occurred.

The Beat Counter detects the occurrence of positive or negative beat cycles. When the net number of beat cycles exceeds plus 1, each successive positive beat cycle which thereafter occurs causes the Beat Counter 20 to issue an output pulse which is registered on the "sharp" indicator. The occurrence of a negative beat cycle causes the Beat Counter 20 to be reset to zero.

In a like manner, when the net number of beat cycles exceeds minus 1, on each successive negative beat cycle that thereafter occurs, the Beat Counter 20 issues an output pulse which is registered on the "flat" indicator 90 (FIG. 3). The occurrence of a positive beat cycle following a negative beat cycle causes the Beat Counter to be set to zero. This method counting provides cancellation of successive alternate positive beat cycles (sharp) and negative beat cycles (flat).

As will be described hereinbelow, the cancellation or suppression of outputs occurring on successive alternate sharp and flat beat cycles is necessary if a meaningful display is to result since this condition prevails when both oscillators are very nearly in phase. The suppression of alternate sharp and flat beat cycles also provides that the average beat frequency is displayed when there is vibrato present in the musical tone or when the Slave oscillator is being synchronized by a subharmonic tone.

Referring to FIGS. 2 and 4, when the $\phi A$ and $\phi B$ signals generated by the Reference oscillator are applied to the lines 24 and 26, the Lock-out flip-flop FF1 will be alternately set and cleared and the waveform A in FIG. 4 represents the signal which will appear at the Reset output terminal of FF1 so as to be applied to a first input terminal of gate 40.

Waveform B in FIG. 4 represents the output from the Slave oscillator which appears on line 18. In this waveform the first excursion takes place immediately prior to the generation of the $\phi A$ reference signal in the second cycle. The second excursion represents an output from the Slave oscillator occurring immediately after the initiation of the $\phi A$ reference clock pulse in the fourth cycle. The Slave oscillator output pulses are represented in this fashion to clearly illustrate the operation of the Lock-out circuit which is effective to assure the generation of one and only one output pulse from the Lock-out circuit for each input pulse from the slave oscillator.

Waveform C represents the signals appearing at the Set output terminal of FF2 while waveforms D and E represent the signals appearing at the Set output terminal and the Reset output terminal of flip-flop FF3, respectively.

It can be seen that FF1 is set on $\phi A$, causing a lock-out condition at gate 40. This lock-out continues until the next $\phi B$ pulse clears FF1. A negative pulse from the Slave oscillator on line 18 sets FF2. The signal produced upon the setting of FF2 propagates through gate 40, provided it is not locked out, and sets FF3. The setting of FF3 causes a Reset pulse to pass over conductor 38 to clear the flip-flop FF2. If the gate 40 is disabled by a lock-out, FF2 remains set until the lock-out is cleared, after which the count in FF2 is propagated to FF3 and FF2 is then reset. Should it happen that the output of the Slave oscillator 16 is coincident with a $\phi A$ clock pulse, it will either be counted in the current cycle or the next succeeding cycle, but not both. The Lock-out circuit assures that FF3 is stable during the time that the $\phi A$ clock pulse is up when the state of FF3 is propagated to FF4 by way of gates 42 and 44.

Flip-flops FF4, FF5, FF6, and FF7 form a dual rank, two-bit shift register consisting of the four stages $N_o$, $N^1_o$, $N_1$, and $N^1_1$. During the intervals in which the $\phi A$ clock pulse is up, data is propagated from the Lock-out circuit 32 to stage $N_o$ by way of gates 42 and 44 and from stage $N_0$ to stage $N^1_0$ by way of gates 46 and 48 and from stage $N_1$ to stage $N^1_1$ by way of gates 58 and 60.

Also at the time that the $\phi A$ clock pulse signal is up, stage $N_2$, i.e., FF8, will be set if stages $N_0$ and $N_1$ are both simultaneously set or will reset if stages $N_0$ and $N_1$ are simultaneously reset. The result of this is that stage $N_2$ is set when the last beat was sharp and is cleared when the last beat was flat. In certain applications it may be desirable to indicate this condition directly. For example, by individually ANDing the output from the "Set" side of FF2 with the "Set" and "Reset" outputs of FF8, it is possible to modulate the intensity of the sharp or flat indicator lamps as a function of the relative phase between the output from the Slave oscillator and the reference waveform, thus producing an equivalent manifestation of the sign and magnitude of the frequency difference.

Gate 68 will produce an output to turn on the sharp indicator lamp 76 whenever stages $N_o$, $N_1$ and $N_2$ are simultaneously in their set condition. Similarly, when stages $N_o$, $N_1$ and $N_2$ are simultaneously in their reset state, gate 70 will produce a control signal for turning on the flat indicator lamp 90.

Figure 5:
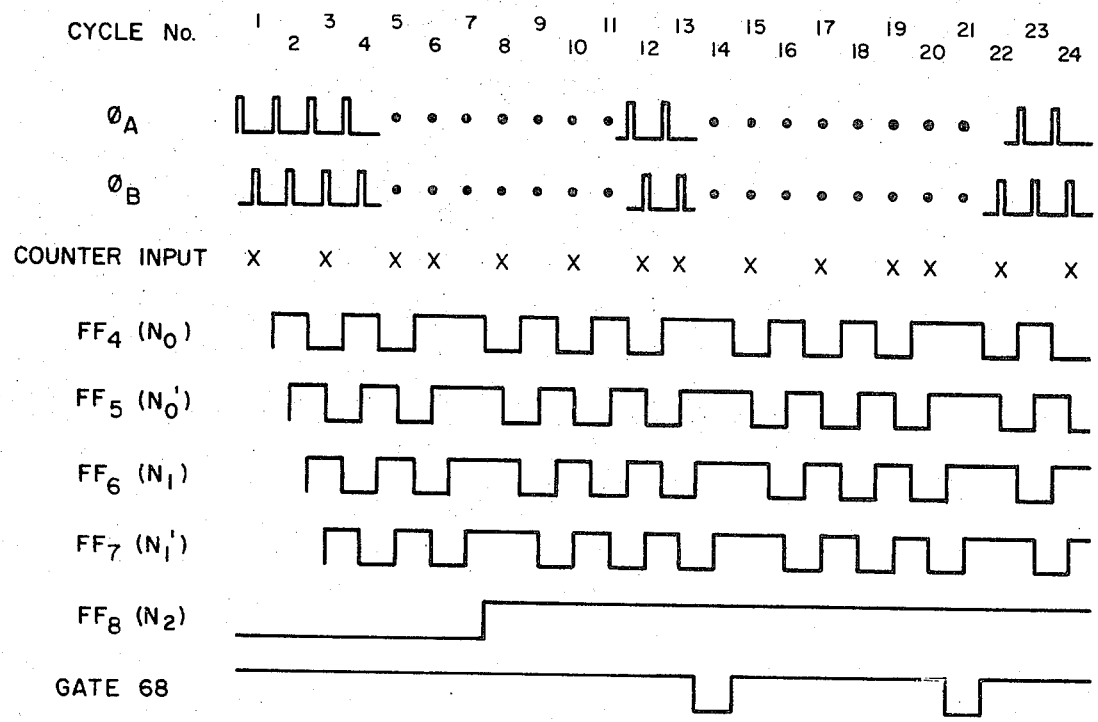
FIG. 5 illustrates by means of waveforms the signals appearing at various points in the circuit of FIG. 2 when a sharp condition exists.

The operation of the invention can be best understood by observing the responsive of the circuit to specific assumed input conditions. FIG. 5 illustrates the manner in which sharp beats are detected. Consecutive cycle of operation are identified by the cycle number appearing at the top of the Figure. A particular cycle begins when the $\phi A$ clock pulse is produced and ends with the subsequent production of a $\phi A$ clock pulse on the next succeeding cycle. As has already been mentioned the $\phi A$ and $\phi B$ clock pulses are underlapped such that the $\phi B$ pulses occur approximately midway in each cycle. The $\phi A$ and $\phi B$ clock pulses are illustrated on the second and third lines of FIG. 5.

In this Figure it is assumed that pulses from the Slave oscillator propagate through the Lock-out circuit to set FF3 during cycles 1, 3, 5, 6, 8, 10, 12, 13, 15, 17, 19, 20, 22 and 24. As was mentioned earlier, a beat condition is interpreted by testing the output of the Slave oscillator over a time period defined by two cycles of the Reference oscillator. The next four lines in FIG. 5 labeled FF4 ($N_o$), FF5 ($N^1_o$) . . . FF7 ($N^1_1$) represent the signal patterns which will be observed at the Set output terminal of the particularly identified flip-flops at any given time upon the application of the assumed counter inputs at the various times indicated. Specifically, the occurrence of a negative going input pulse on line 18 during cycle 1 causes stage $N_0$ to be set in cycle 2 and stage $N_1$ to be set in cycle 3. Similarly, the absence of an input pulse on line 18 during cycle 2 causes stage $N_0$ to be reset or cleared in cycle 3 and stage $N_1$ to be cleared in cycle 4. Input pulses occurring in two successive cycles, e.g., cycles 5 and 6, constitute a sharp beat and results in both stages $N_0$ and $N_1$ being set in cycle 7. During the $\phi A$ clock pulse of cycle 8, then, gate 62 will be fully enabled and would produce an output signal which will set FF8 of stage $N_2$ as indicated in the ninth line of FIG. 5.

In cycles 12 and 13, the Slave oscillator again produced an output on conductor 18 during each cycle. As mentioned above, this is defined as the sharp beat condition. As a result, stages $N_0$, $N_1$, and $N_2$ will be simultaneously set during cycle 14 so that gate 68 will be fully enabled and will produce an output pulse on conductor 72 which, in effect, causes the capacitor 86 in the sharp beat indicator circuit to be discharged as previously described. The sharp beat indicator 76 will accordingly be illuminated for a time period determined by the parameters of resistor 84 and capacitor 86.

Once again, the Slave oscillator produces a negative going output pulse on conductor 18 during two successive cycles, namely cycles 19 and 20. During cycle 21, then, the gate 68 is again fully enabled to produce an output pulse on line 72 to turn on the sharp beat indicator lamp. This type of operation will continue so long as the sharp beat pattern continues to be produced without an intervening flat beat condition.

Figure 6:
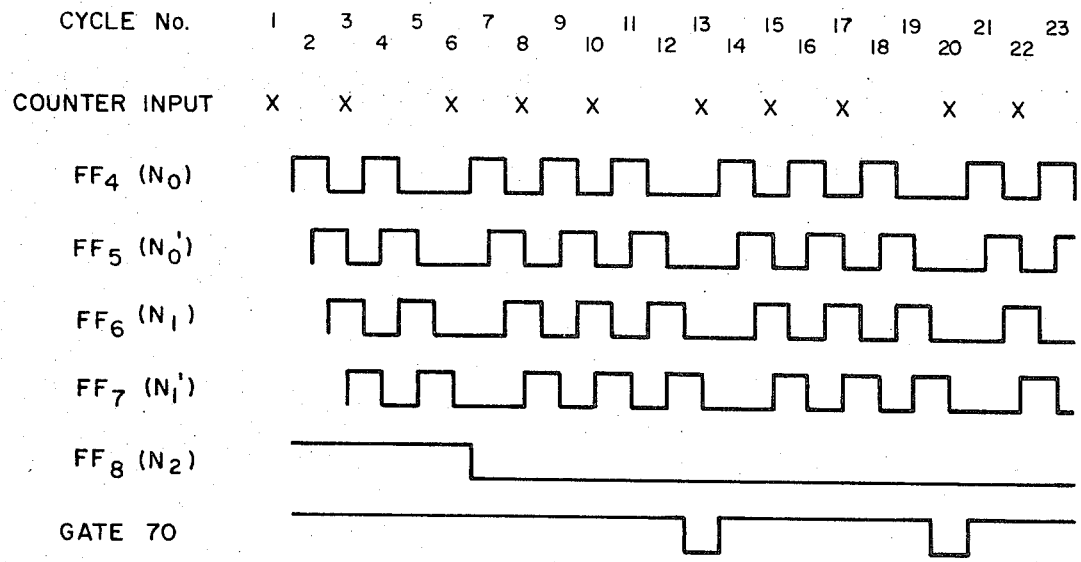
FIG. 6 illustrates by means of waveforms the signals appearing at various points in the circuit of FIG. 2 when a flat condition exists.

FIG. 6 illustrates the waveforms observed at various indicated points in the Lock-out and Beat Counter network of FIG. 2 when the Slave oscillator fails to produce a pulse during a time period defined by two cycles of the Reference clock pulse. As previously mentioned, this is the flat condition. As is indicated by the second line of FIG. 6, the Slave oscillator produces an output signal on line 18 during cycles 1, 3, 6, 8, 10, 13, 15, 17, 20, and 22. Cycles 4 and 5, 11 and 12, and 18 and 19 represent time periods of two cycles of the Reference waveform in which no output is produced by the Slave oscillator. The first flat beat occurring in cycles 4 and 5 results in the clearing of FF8 during cycle 7 since at this time gate 64 will produce an output pulse for accomplishing this result. The next flat beat condition occurs in cycles 11 and 12 when, again, the Slave oscillator 16 fails to produce an output pulse in two successive cycles of the Reference oscillator 22. Since stage $N_2$ was cleared by the first flat beat condition which occurred in cycles 4 and 5, stages $N_0$, $N_1$ and $N_2$ will be simultaneously reset during cycle 13 causing gate 70 to be fully enabled. A negative pulse is thereby produced on conductor 74 to turn on the transistor 92 for a time period determined by the parameters of resistor 94 and capacitor 96. With transistor 92 conductive, the flat indicator lamp 90 will be illuminated all as previously described, In a similar fashion, during cycle 20 following the flat beat condition in cycles 18 and 19, stages $N_0$, $N_1$ and $N_2$ will be simultaneously reset and another flat indicator control pulse will be emitted by the gate 70 on line 74.

Figure 7:
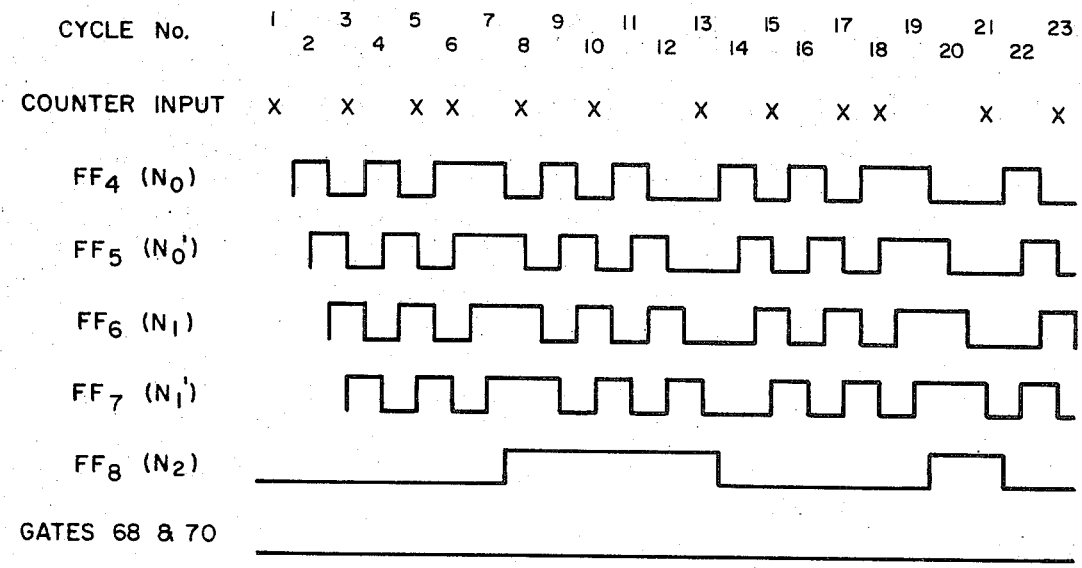
FIG. 7 illustrates the waveforms observed at various points in the circuit of FIG. 2 when alternate sharp and flat beats occur.

FIG. 7 is intended to illustrate the manner in which alternate sharp and flat conditions cause the suppression of any output signals from either the gate 68 or the gate 70. It is initially assumed that stage $N_2$ is cleared. The sharp beat occurring in cycles 5 and 6 cause stage $N_2$ to be set in cycle 8. The occurrence of the flat beat condition in cycles 11 and 12 causes FF8 in stage $N_2$ to be reset in cycle 14. Hence, the sharp beat condition exisitng in cycles 17 and 18 does not cause stages $N_0$, N₁ and N₂ to be simultaneously set. No ouptut results from the gate 68. In fact, so long as sharp conditions and flat conditions alternate, neither gate 68 nor gate 70 will ever be fully enabled to produce triggering pulses for the indicator lamps 76 and 90 (FIG. 3).

While the digital frequency measuring apparatus of this invention has been described with reference to a particular preferred embodiment, it is to be understood that various modifications may be made in the construction thereof without departing from the spirit and scope of the invention. Accordingly, it is to be expressly understood that the foregoing description shall be interpreted only as illustrative of the invention and the claims be accorded as broad an interpretation as is consistent with the basic concepts herein taught.

What is claimed is:

1. Instrument tuning apparatus comprising:
    a. a transducer for converting audio energy into an electrical waveform;
    b. a first oscillator adapted to produce pulse type signals coupled to the output of said transducer means for generating pulses having a repetition rate determined by the fundamental frequency of the audio energy impressed upon said transducer means;
    c. a source of reference pulses of a frequency which is a predetermined multiple of the frequency of the pulse signals produced by said first oscillator;
    d. digital logic circuit means responsive to the output pulses from said first oscillator and said reference pulses for counting the number of output pulses from said first oscillator occurring during a given number of cycles of said reference pulses; and
    e. indicator means coupled to the output of said digital logic circuit means for producing an observable manifestation indicating each occurrence when more than or less than a predetermined number of output pulses from said first oscillator occur during successive periods of said given number of cycles of said reference pulses.

2. Apparatus as in claim 1 wherein said source of reference pulses is a second oscillator which produces two-phase underlapped output pulses the frequency of which are a predetermined multiple of the frequency of said audio energy.

3. Apparatus as in claim 2 wherein saiid predetermined multiple is two.

4. Apparatus as in claim 3 wherein said digital logic circuit means comprises:
    a. a multi-stage counter, and
    b. Lock-out means connected to receive said two-phase underlapped pulses and the output from said first oscillator coupled to said multi-stage counter for producing one and only one pulse therefrom for each pulse from said first oscillator.

5. Apparatus as in claim 4 wherein said multi-stage counter comprises:
    a. a plurality of stages, each including a bistable circuit having first and second input terminals and first and second output terminals, and a pair of coincidence circuits each having first and second input terminals and an output terminal, the output terminal of each of said pair of coincidence circuits being connected to a respective one of said first and second input terminals of said bistable circuit;
    b. means connecting the first and second output terminals of the bistable circuits in one stage individually to the first input terminals of the pair of coincidence circuits in an adjacent stage; and
    c. means connecting one phase of said two-phase underlapped output pulses to the second input terminals of both coincidence circuits on a first group of alternate stages and the other phase of said two-phase underlapped output pulses to the second input terminals of both coincidence circuits on the remaining group of alternate stages.

6. Apparatus for tuning musical instruments comprising:
    a. a variable frequecy clock pulse generator for producing two-phase underlapped clock pulses having a range of frequencies corresponding to the twelve tones comprising the tempered chromatic scale;
    b. a Slave oscillator adapted to produce pulse type signals of a frequency corresponding to the tone of the instrument to be tuned and approximately one-half the frequency of said clock pulses;
    c. a Lock-out circuit coupled to receive the output from said Slave oscillator and said clock pulses for allowing the passage of one and only one pulse from said Slave oscillator during any one cycle of said two-phase underlapped clock pulses;
    d. counter means coupled to the output of said Lock-out circuit for summing the number of times that the absence or presence of pulses from said Slave oscillator occur in two successive time periods each equal to two cycles of said two-phase underlapped clock pulses; and
    e. indicator means coupled to the output of said counter means for producing an observable manifestation when said number exceeds one.

7. Apparatus as in claim 6 wherein said Lock-out circuit comprises:
    a. first, second and third flip-flops each having set and reset input and output terminals;
    b. means for applying the first phase and the second phase of said two-phase clock pulses respectively to the set input terminal of said first flip-flop and reset input terminals of said first and third flip-flops;
    c. means connecting the output of said Slave oscillator to the set input of said second flip-flop;
    d. gating means connected to the reset output terminal of said first flip-flop and the set output terminal of said second flip-flop for producing an output therefrom when said second flip-flop is simultaneously set;
    e. means connecting the output of said gating means to the set terminal of said third flip-flop; and
    f. means connecting the reset output terminal of said third flip-flop to the reset input terminal of said second flip-flop.

8. Apparatus as in claim 7 wherein said counter means comprises:
    a. five concatenated stages, each stage including:
        1. A flip-flop having set and reset input and output terminals;
        2. first and second gating means each having at least two input terminals and an output terminal;
        3. means connecting the output terminal of said first gating means to the set input terminal of said flip-flop, and the output terminal of said second gating means to the reset input terminal of said flip-flop;

b. means connecting the set output terminal of the flip-flop in a given stage to one of said input terminals of the first gating means of the next higher order adjacent stage and the reset output terminal of the flip-flop in said given stage to one of said input terminals of the second gating means of said next higher order adjacent stage;

c. means connecting the first phase of said two-phase clock pulses to another of said input terminals of said first and second gating means on alternate ones of said stages and the second phase of said two-phase clock pulses to another of said input terminals of said first and second gating means of the remaining stages; and d. means connecting the set and reset output terminals of the flip-flop in said second stage respectively to another input terminal on said first and second gating means in said fifth stage.

9. Apparatus as in claim 8 wherein said indicator means comprises:

a. third and fourth gates each having three input terminals and an output terminal;

b. means connecting the reset output terminals of the flip-flops in the first, third and fifth stage to the three input terminals of said third gate and the set output terminal of the flip-flops in said first, third and fifth stages to the three input terminals of said fourth gate;

c. first and second indicator devices adapted to provide an observable manifestation when connected to a current source;

d. first and second semiconductor switching means respectively connected to said first and second indicator means and to a current source; and e. means connecting the output terminal of said third gate to said first semiconductor switching means and the output terminal of said fourth gate to said second semiconductor switching means.

* * * * *